June 9, 1953     D. C. ORCUTT ET AL     2,641,137
POWER TRANSMISSION MECHANISM
Filed Aug. 28, 1951
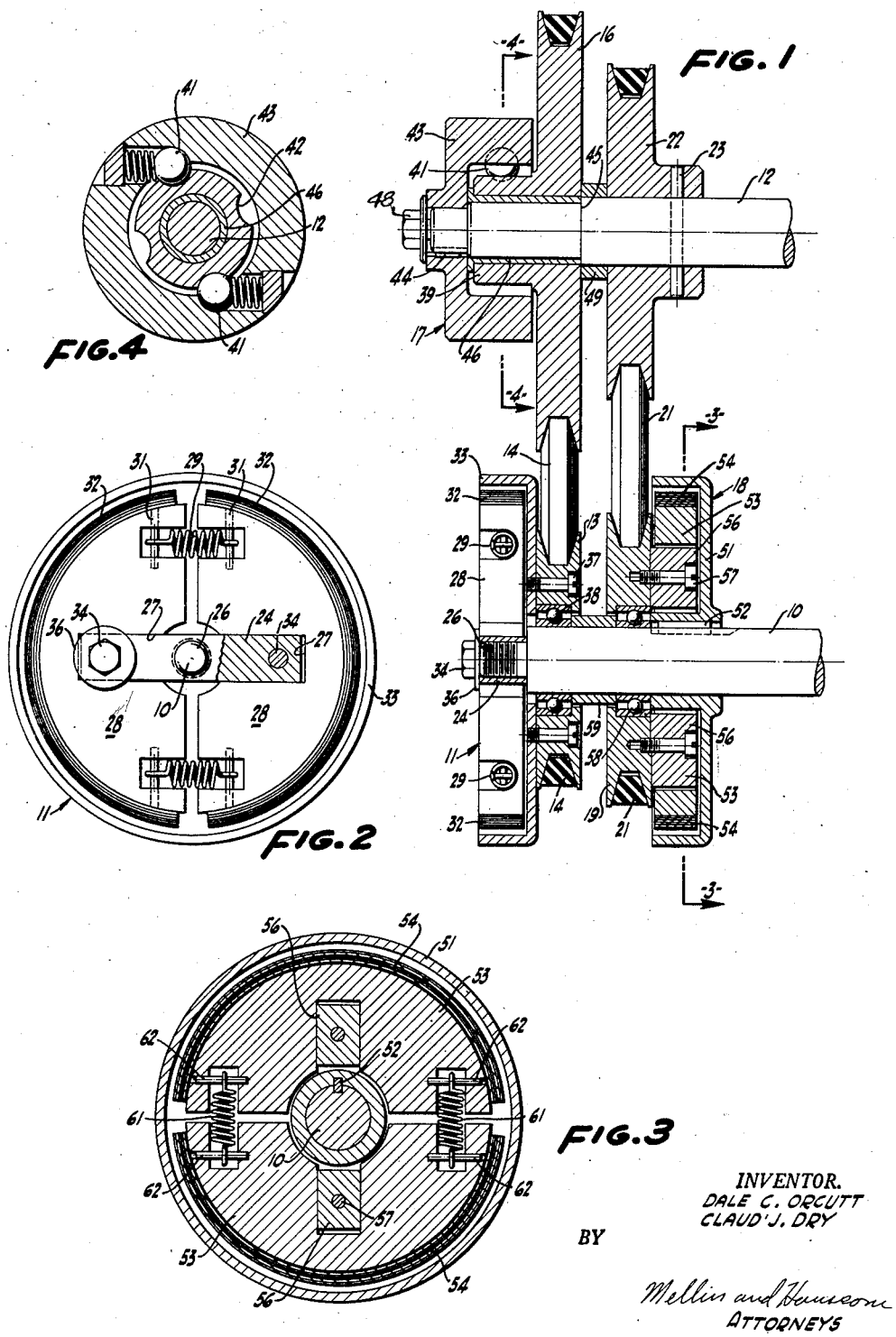
INVENTOR.
DALE C. ORCUTT
CLAUD J. DRY
BY
Mellin and Hanson
ATTORNEYS Patented June 9, 1953

2,641,137

UNITED STATES PATENT OFFICE 2,641,137

POWER TRANSMISSION MECHANISM

Dale C. Orcutt and Claud J. Dry, Athens, Ohio

Application August 28, 1951, Serial No. 243,942

5 Claims. (Cl. 74—217)

This invention relates to a power transmission mechanism.

A main object of the present invention is to provide a simple power transmission mechanism which is operable to automatically shift from a low speed ratio drive to a high speed ratio drive.

Another object of the present invention is to provide a power transmission mechanism having a driving and driven shaft connected by two driving mechanisms which have different ratio drives and which mechanisms are so constructed that one of the mechanisms is operable to drive at a low driving speed of the driving shaft and the other mechanism is arranged to drive at a higher speed of the driving shaft.

Various other objects of the invention will be apparent from the following description taken in connection with the accompanying drawings wherein Fig. 1 is a sectional view through a power transmission mechanism embodying the concepts of the present invention.

Fig. 2 is an end view of the low speed centrifugal clutch as shown in Fig. 1.

Fig. 3 is a sectional view along line 3—3 of Fig. 1 showing the construction of the high speed centrifugal clutch.

Fig. 4 is a cross-sectional view taken along line 4—4 of Fig. 1 showing the construction of the over-running clutch.

The power transmission mechanism of the present invention as disclosed in Fig. 1 comprises, in general, a driving shaft 10 having a low speed centrifugal clutch generally entitled 11 mounted on the outboard end thereof. A driven shaft 12 is adapted to be driven by a low speed centrifugal clutch 11 through a pulley 13, a belt 14, a pulley 16 and an overrunning clutch generally entitled 17 mounted on the outboard end of driven shaft 12. There is a high speed centrifugal clutch generally entitled 18 mounted on driving shaft 10 inwardly of the low speed centrifugal clutch 11 and adapted to drive driven shaft 12 through a pulley 19, a belt 21 and a pulley 22 which is pinned at 23 to the driven shaft 12. The driving connection between low speed centrifugal clutch 11 and driven shaft 12 has a ratio of driving speed to driven speed lower or smaller than the ratio of the driving connection between the high speed centrifugal clutch 18 and the driven shaft 12 as can be appreciated by comparing the sizes of the pulleys. In general terms, the low speed clutch 11 is adapted to engage at a relatively low speed permitting the driven shaft 12 to be driven by a low ratio drive, and high speed clutch 18 is adapted to engage at a higher speed permitting the driving shaft 12 to be driven by a high ratio drive, said overrunning clutch being operative when the high ratio drive is established to allow idling of the low ratio drive.

The low speed centrifugal clutch 11 comprises a driving bar 24 threadedly secured at 26 to the outer end of driving shaft 10 and slidably received within slots 27 provided in movable clutch elements 28 of clutch 11. Movable clutch elements 28 are urged inwardly toward one another by tension springs 29 secured to the clutch element 28 by pins 31. Each of the movable clutch elements 28 has a composition facing 32 secured thereto for engagement with the inner surface of a clutch drum 33 as clearly shown in Figs. 1 and 2. The clutch elements 28 are retained in place by means of screws 34 threaded into driving bar 24 and washers 36 on the screws slidably engaging the movable elements 28. Clutch drum 33 is secured by screws 37 to pulley 13, said pulley being mounted by a ball-bearing 38 on shaft 10.

It is not particularly important what kind of drive is provided between the centrifugal clutches and driven shaft 12 in that the drive may be a pulley drive, a chain drive, or a gear drive or any other equivalent drive. A pulley drive is being shown for purposes of convenience but is distinctly not intended to limit the invention.

The overrunning clutch 17 has a driving member 39 formed integrally with or fixedly secured to pulley 16, said driving member being provided with recesses 42 for engagement with spring pressed balls 41 carried by a driven element 43 keyed at 44 to driven shaft 12. There is a shoulder 45 provided on driven shaft 12 against which bears a bushing 46. Bushing 46 rotatably supports pulley 16 and is clamped against the shoulder by a screw 48. A spacer 49 is disposed between pulley 16 and pulley 19.

The high speed centrifugal clutch 18 comprises a clutch drum 51 keyed at 52 to driving shaft 10 and adapted to cooperate with movable clutch elements 53 which are provided with composition facings 54 for engagement with the interior surface of clutch drum 51. Clutch drum 51 is provided with a hub to receive the key 52.

Movable clutch elements 53 are slidably mounted on driving bars 56 which are secured by screws 57 to driving pulley 19, said driving pulley being rotatably mounted on driving shaft 10 by a ball bearing 58. There is a suitable spacer 59 between ball bearings 58 and 38 to properly space the elements on driving shaft 10. There are tension springs 61 connected at their ends to elements 53 by means of pins 62.

A summary of the foregoing discloses that the engaging clutch elements of the low speed clutch are actuated by the speed of the driving shaft 10, while the engaging clutch elements of the high speed clutch are actuated by the speed of pulley 19, freely rotatable on shaft 10 and driven by the driven shaft 12. Therefore, the absolute speed at which the high speed and low speed clutches engage may be the same, although the clutches would engage at different speeds of the driving shaft since the engaging elements of the high speed clutch are indirectly driven through a step down arrangement by the driving shaft while the engaging elements of the low speed clutch are directly driven by the driving shaft.

The operation of the device is as follows:

At a suitable predetermined low speed, the clutch elements 28 under the influence of centrifugal force will move outwardly so that the facings 32 thereof will engage the drum 33 to establish a driving connection through the overrunning clutch 17 to driven shaft 12. As the speed of the driving shaft 10 increases, it is desirable to have a higher ratio drive between the driving shaft 10 and the driven shaft 12 and at a predetermined speed, the movable clutch elements 53 of high speed clutch 18, being driven by the driven shaft 12 through the pinned pulley 22, move outwardly and the facings 54 thereof engage the clutch drum 51 to establish a driving connection through the driven shaft 12. The driving connection through high speed centrifugal clutch 18 having a higher ratio than the drive established through low speed centrifugal clutch 17 will therefore drive the driven shaft 12 at a higher speed than it was previously being driven. The driven element 43 of the overrunning clutch will therefore move with respect to the driving member 39 in a reverse direction and therefore overruns the driving member 39 so that the drive through clutch 17 and pulley 16 is merely an idling drive. The operative drive now proceeds through driving shaft 10, high speed centrifugal clutch 18 and pulley 22 and driven shaft 12. Of course, when the speed of the driving shaft drops to a point where the movable clutch elements 53 of high speed centrifugal clutch 18 disengages the drum 51, the drive through pulley 22 will cease and the spring pressed ball 41 of the overrunning clutch 17 will once again seat and therefore establish a driving connection to driving shaft 12 through the overrunning clutch.

The parts are so constructed that, after a drive through the high speed clutch has been established, and the speed of the driven shaft increases, the spring pressed balls 41 under the influence of centrifugal force will move outwardly and clear the driven element 43 and therefore none of the component moving parts of the overrunning clutch are in contact with one another thus eliminating wear and the need for lubrication.

It is pointed out that a friction clutch engages at a higher speed than that at which it disengages due to the friction slippage accompanying engagement. For example, a vehicle having a power transmission of the present invention incorporated therein operates as follows. The transmission has high and low speed clutches which engage at the same absolute speed (not same speed of driving shaft, however) and disengage at the same absolute speed. The vehicle shifts into high speed drive at approximately fourteen miles per hours, at a comparatively high engine speed. Once engaged, the high speed clutch stays engaged under full power until the vehicle is pulled down to about six or seven miles per hour at which speed the engine runs at a relatively low speed. At this low speed, both the high speed and the low speed clutches simultaneously disengage, but since the engine throttle is open on the pull, the engine will immediately speed up due to the decreased load on it, to cause engagement of only the low speed clutch (the high speed clutch at this time being only indirectly driven by the driving shaft). This happens so quickly that there is little noticeable loss of speed in the vehicle and is a good feature since the driver can feel the boost of the low speed drive take hold.

When coming to a stop, with the throttle closed of course, the low speed clutch does not re-engage because the speed of the engine diminishes too much to cause such an engagement.

Therefore, by the present invention a very simple automatically operating power transmission mechanism has been provided whereby a high ratio drive is automatically established at a predetermined speed of the driving shaft and the low speed ratio drive is automatically disconnected.

Having thus described our invention, what we claim and desire to secure by Letters Patent is:

1. A power transmission mechanism comprising a driving shaft, a driven shaft, means including a centrifugal clutch on said driving shaft, driven by the driven shaft and responsive to a predetermined speed of the driven shaft to establish a driving connection between the shafts, other means including a second centrifugal clutch mounted on said driving shaft responsive to a predetermined speed of the driving shaft to establish a driving connection between said shafts, and means on said driven shaft for discontinuing the driving connection established by the second named means when said first named means establishes a driving connection.

2. A power transmission mechanism comprising a driving shaft, a driven shaft, means including a centrifugal clutch rotatably mounted on said driving shaft responsive to a predetermined speed of the driven shaft to establish a driving connection between the shafts, other means including a second centrifugal clutch mounted on said driving shaft responsive to a predetermined speed of the driving shaft to establish a driving connection between said shafts, and means on said driven shaft for discontinuing the driving connections established by the second named means when said first named means establishes a driving connection, the ratio of driving speed to driven speed of the driving connection established by the first named means being greater than the ratio of the driving connection established by the second named means.

3. A power transmission mechanism comprising a driving shaft, a driven shaft, means including a centrifugal clutch on said driving shaft responsive to a predetermined speed of the driven shaft to establish a driving connection between the shafts, other means including a second centrifugal clutch mounted on said driving shaft responsive to a predetermined speed of the driving shaft to establish a driving connection between said shafts, and means on said driven shaft for discontinuing the driving connection established by the second named means when said first named means establishes a driving connection, the second named means being responsive to a lower speed of the driving shaft than the first named means.

4. A power transmission mechanism comprising a driving shaft, a driven shaft, means including a centrifugal clutch on said driving shaft responsive to a predetermined speed of the driven shaft to establish a driving connection between the shafts, other means including a second centrifugal clutch mounted on said driving shaft responsive to a predetermined speed of the driving shaft to establish a driving connection between said shafts, and means on said driven shaft for discontinuing the driving connection established by the second named means when said first named means establishes a driving connection, the ratio of driving speed to driven speed of the driving connection established by the first named means being greater than the radio of the driving connection established by the second named means, the second named means being responsive to a lower speed of the driving shaft than the first named means.

5. A power transmission mechanism comprising a driving shaft, a driven shaft, means including a centrifugal clutch driven by the driving shaft and responsive to a predetermined speed of the driving shaft to establish a driving connection between the shafts, other means including a second centrifugal clutch responsive to a predetermined speed of the driving shaft to establish a driving connection between said shafts, and means on said driven shaft for discontinuing the driving connection established by the second named means when the first named means establishes a driving connection.

DALE C. ORCUTT.
CLAUD J. DRY.

References Cited in the file of this patent

UNITED STATES PATENTS

| Number | Name | Date |
|---|---|---|
| 1,983,827 | Winther et al. | Dec. 11, 1934 |
| 2,463,100 | Gredell | Mar. 1, 1949 |
| 2,538,667 | Chamberlain | Jan. 16, 1951 |